United States Patent
Kothavale et al.

(10) Patent No.: US 11,003,792 B2
(45) Date of Patent: **\*May 11, 2021**

(54) SYSTEMS AND METHODS FOR OBTAINING ANONYMIZED INFORMATION DERIVED FROM DATA OBTAINED FROM EXTERNAL DATA PROVIDERS

(71) Applicant: FortifID, Inc., San Jose, CA (US)

(72) Inventors: Shantanu Rajkumar Kothavale, Cupertino, CA (US); Anirban Basak, San Jose, CA (US); Michael Brown, Fremont, CA (US); Danny Y. Lee, San Mateo, CA (US); Prashant Kediyal, Fremont, CA (US); Ronald C. Lee, San Francisco, CA (US)

(73) Assignee: FortifID, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/506,844

(22) Filed: Jul. 9, 2019

(65) Prior Publication Data

US 2020/0110898 A1    Apr. 9, 2020

Related U.S. Application Data

(63) Continuation of application No. 16/274,070, filed on Feb. 12, 2019, now Pat. No. 10,395,058.

(Continued)

(51) Int. Cl.
*H04N 7/16*     (2011.01)
*G06F 21/62*    (2013.01)
(Continued)

(52) U.S. Cl.
CPC .... *G06F 21/6245* (2013.01); *G06F 16/24573* (2019.01); *H04L 63/0407* (2013.01); *H04L 63/0421* (2013.01)

(58) Field of Classification Search
None
See application file for complete search history.

(56) References Cited

U.S. PATENT DOCUMENTS

| 9,635,000 | B1 | 4/2017 | Muftic |
| 10,530,577 | B1 | 1/2020 | Pazhoor et al. |

(Continued)

FOREIGN PATENT DOCUMENTS

WO    2010/096684 A2    8/2010

OTHER PUBLICATIONS

International Search Report and Written Opinion for Application No. PCT/US2019/025221, dated Jul. 5, 2019, 10 pages.

(Continued)

*Primary Examiner* — Brandon S Hoffman
(74) *Attorney, Agent, or Firm* — Nicholson De Vos Webster & Elliott LLP

(57) ABSTRACT

Techniques are described for providing access to anonymized user data derived from external data providers. A persona management system generates a searchable data store containing metadata related to a plurality of users of the persona management system. The metadata includes entries indicating: a first identifier of a user of the plurality of users of the persona management system, a second identifier of an external data provider of a plurality of external data providers that possess data related to users of the persona management system, a third identifier of an algorithm that is used to transform data possessed by the external data provider related to the user of the persona management system into one or more transformed data values, and the one or more transformed data values. In response to requests from various data consumers, the persona management system uses the metadata to identify users matching specified search criteria.

20 Claims, 5 Drawing Sheets

Related U.S. Application Data

(60) Provisional application No. 62/741,443, filed on Oct. 4, 2018.

(51) Int. Cl.
*G06F 16/2457* (2019.01)
*H04L 29/06* (2006.01)

(56) References Cited

U.S. PATENT DOCUMENTS

| | | |
|---|---|---|
| 2003/0229783 A1 | 12/2003 | Hardt |
| 2006/0026042 A1 | 2/2006 | Awaraji et al. |
| 2011/0145056 A1* | 6/2011 | Sullivan .............. H04L 41/5064 705/14.41 |
| 2012/0023568 A1 | 1/2012 | Cha et al. |
| 2013/0124400 A1 | 5/2013 | Hawkett |
| 2013/0212699 A1 | 8/2013 | Pollard |
| 2013/0246120 A1 | 9/2013 | Chang et al. |
| 2014/0172567 A1 | 6/2014 | Manoogian et al. |
| 2015/0348341 A1 | 12/2015 | Baxley et al. |
| 2016/0063657 A1 | 3/2016 | Chen et al. |
| 2017/0228550 A1 | 8/2017 | Harb |
| 2019/0005223 A1 | 1/2019 | Messerges et al. |
| 2019/0013948 A1 | 1/2019 | Mercuri et al. |
| 2019/0164156 A1 | 5/2019 | Lindemann |
| 2019/0253254 A1 | 8/2019 | Brownlee et al. |
| 2019/0312734 A1 | 10/2019 | Wentz et al. |
| 2019/0356491 A1 | 11/2019 | Herder et al. |
| 2020/0036707 A1 | 1/2020 | Callahan et al. |
| 2020/0084046 A1 | 3/2020 | Bessonov et al. |
| 2020/0137064 A1 | 4/2020 | Wu et al. |
| 2020/0162251 A1 | 5/2020 | Wentz |
| 2020/0162254 A1 | 5/2020 | Moreno et al. |

OTHER PUBLICATIONS

Notice of Allowance received for U.S. Appl. No. 16/219,745, dated Sep. 19, 2019, 15 pages.
International Search Report and Written Opinion, PCT App. No. PCT/US2019/054442, dated Dec. 19, 2019, 14 pages.
Nakamoto, S., et al., "Bitcoin: A Peer-to-Peer Electronic Cash System," 2008, 9pgs https://bitcoin.org/bitcoin.pdf (downloaded: Mar. 23, 2019).
Non-Final Office Action from U.S. Appl. No. 16/219,745, dated Mar. 28, 2019, 12 pages.
Notice of Allowance from U.S. Appl. No. 16/274,070, dated May 28, 2019, 14 pages.
Non-Final Office Action, U.S. Appl. No. 16/810,122, dated Jun. 10, 2020, 11 pages.

* cited by examiner

US 11,003,792 B2

SYSTEMS AND METHODS FOR OBTAINING ANONYMIZED INFORMATION DERIVED FROM DATA OBTAINED FROM EXTERNAL DATA PROVIDERS

CROSS-REFERENCE TO RELATED APPLICATIONS

This application claims benefit under 35 U.S.C. § 120 as a continuation of U.S. patent application Ser. No. 16/274,070, filed Feb. 12, 2019, issued as U.S. Pat. No. 10,395,058, which application claims the benefit of U.S. Provisional Application No. 62/741,443, filed Oct. 4, 2018, both of which are hereby incorporated by reference.

TECHNICAL FIELD

Embodiments of the invention relate to the field of digital identity management; and more specifically, to a computer-implemented system for enabling the mediated interaction between entities that seek to identify users matching certain criteria, where the data upon which the attributes are based may be possessed by other external data providers.

BACKGROUND

Many types of service providers and other entities periodically seek to obtain consent from users related to various uses of their private data. When such insight information is sought in the context of a transaction related to that individual, privacy of the individual can be compromised due to the intentional or inadvertent leaking of the individual's private information. For example, when an individual seeks to obtain a mortgage or other type of financial loan, a loan provider typically performs a risk analysis process that requires the individual to provide various items of private information, such as a Social Security Number (SSN). This private information is then often used by the service provider to query various external data providers (for example, banks, credit card providers, and the like) to obtain historical information and other additional data about the individual possessed by the data providers. In many cases, the private information provided by the individual is retained afterwards by the service provider even though the service provider does not need to be in possession of the data beyond the completion of the requested transaction. The transmission, use, and retention of such private data by various service providers and data providers causes individuals' private data to be susceptible to many types of misuse.

BRIEF DESCRIPTION OF DRAWINGS

Various embodiments in accordance with the present disclosure will be described with reference to the drawings, in which.

DETAILED DESCRIPTION

Figure 1:
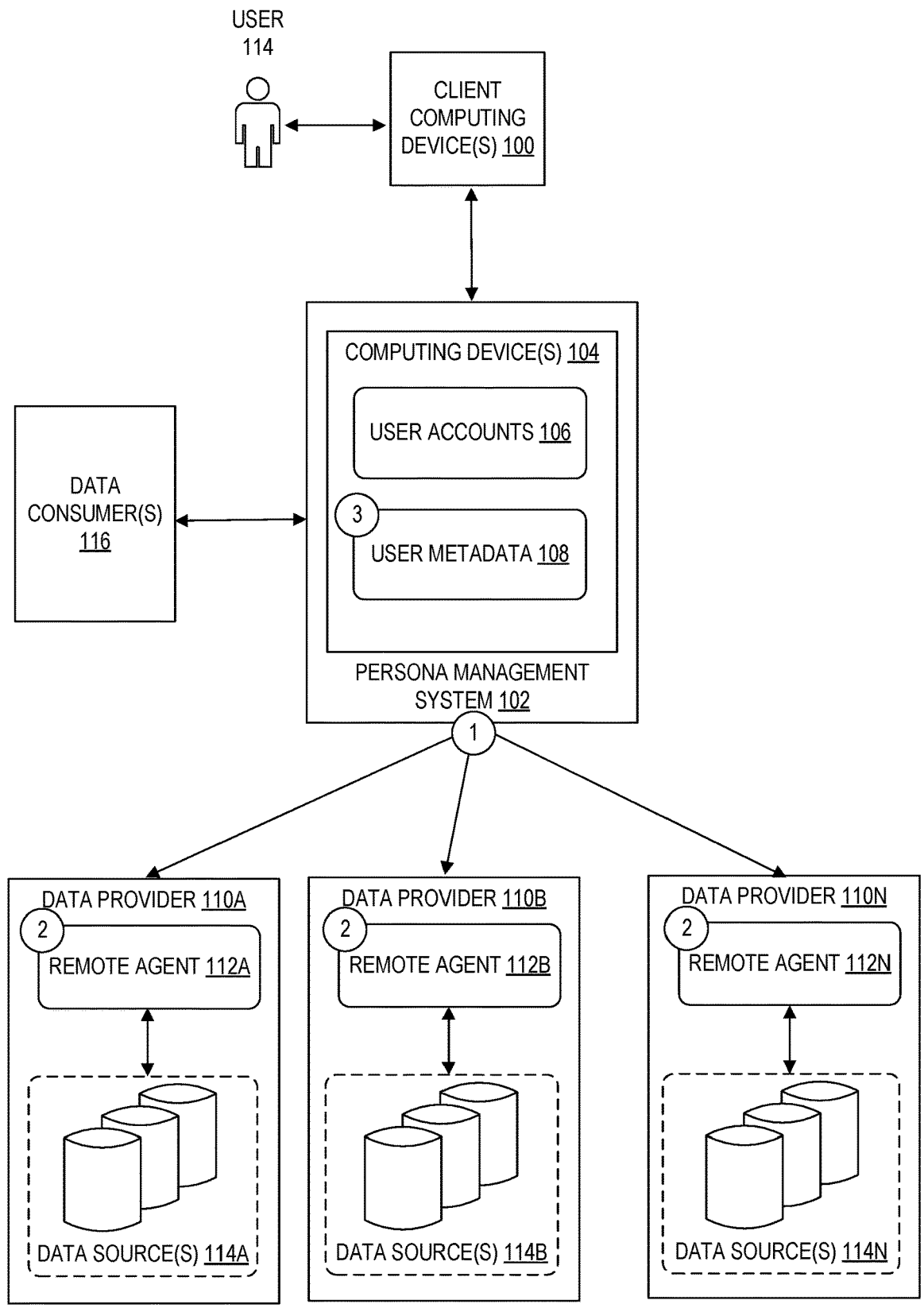
FIG. 1 is a diagram illustrating a computing environment for providing access to anonymized user data derived from external data providers according to some embodiments.

In the following description, many specific details such as logic implementations, types, and interrelationships of system components, and logic partitioning/integration choices are set forth to provide a more thorough understanding of embodiments of the present invention. It will be appreciated, however, by one skilled in the art that embodiments of the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," and so forth, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Systems, methods, apparatuses, computer program products, and machine-readable media are provided to implement a system to allow the mediated interaction between entities (also referred to herein as "data consumers") that seek to analyze data regarding users of a persona management system and to identify users that match certain criteria of interest to the data consumers. The identification of the users may be desired by the data consumers, for example, to send data to the users (for example, data indicating relevant offers of goods and/or services) or for initiating other types of user interaction. According to embodiments described herein, a persona management system enables data consumers to obtain such information while maintaining the personal privacy of users of the persona management system and privacy and security of the users' personal data, which may be possessed by one or more external data providers. In an embodiment, the persona management system further provides consent management and consent enforcement tools for users of the system and generally acts as a safe proxy on behalf of users for interactions with various types of data consumers.

In some embodiments, to enable interactions with data consumers while maintaining users' data security and privacy, a persona management system creates and uses privacy-preserving data sets about users of the system, sometimes also referred to herein as reverse linked-data or user metadata. A user that has created an account with the persona management system, for example, can have user metadata created about the user and which is used to satisfy requests from various data consumers without compromising the privacy of the user or security of the user's data, as described in more detail herein.

In an embodiment, the creation of such user metadata is initiated by a "link gathering phase." In a link gathering phase, the persona management system creates and sends so-called "personal information matching" algorithms to various data providers that possess data about users of the persona management system. In some embodiments, the personal information matching algorithms are received and executed by remote agents running at computing systems of the various data providers, where the remote agents may comprise software agents that are provided to the data providers by an entity managing the persona management system. These remote agents execute the obtained personal information matching algorithms against data stores managed by the data providers and that possess data about users of the persona management system, where the algorithms are generally used to obtain and transform the data about the users into a form that can be used to satisfy search requests from data consumers. For example, if a data provider possesses data indicating a user's sex and birth date, a personal information matching algorithm can be used to transform the user data into a Boolean value indicating whether the user is an adult male. The transformed data generated by the remote agents based on the personal information matching algorithms can thus represent a set of reverse-pointers (or "personal information links") to the data located at the data stores of the data providers. The links gathering phase may be concluded when the personal information matching algorithm(s) have been executed at each relevant data provider, the transformed data is returned to the persona management system, and the user metadata has been created from the returned data for users of the persona management system (e.g., to be stored in association with the users' accounts at the persona management system).

In a second phase (also referred to herein as a "link search phase"), a data consumer seeks to identify users associated with user metadata that satisfies one or more search criteria or who otherwise possess certain defined attributes. The user metadata associated with each user account is searched to identify users who satisfy the specified search criteria. For users that satisfy the requested criteria, the persona management system generates an anonymous identifier that may be specific to a current session with the requesting data consumer and sends the anonymous identifier(s) to the data consumer. For the duration of the session, the data consumer identifies the users of interest using the anonymous identifiers. Among other benefits, the processes described herein enable a persona management system to more efficiently process queries from data consumers and other entities, and to securely mediate interactions between a data consumer and users of the persona management system without involving or divulging sensitive information about the users.

1.0. Persona Management System

FIG. 1 is a diagram illustrating a computing environment for generating user metadata and mediating interactions between data consumers and users of a persona management system, according to some embodiments. In some embodiments, a persona management system 102 comprises one or more software modules executed by one or more electronic computing devices 116 at one or more data centers and geographic locations. A user 114 using one or more client computing device(s) 100 can interact with the persona management system 102 via one or more private or public computer networks, such as the internet. The persona management system 102 and associated components can be hosted by computing device(s) 104 running in an on-premises data center, a cloud-based service provider, or combinations thereof.

In an embodiment, a persona management system 102 manages user accounts 106 for users of the persona management system 102 and possibly other entities associated with the system. The user accounts 106 generally represent stored data including relevant user information (for example, user profile information, public and private key information, and so forth) and can be further associated with user metadata 108. In some embodiments, the persona management system 102 also maintains consent management data associated with users of the persona management system, where such data generally indicates types of interactions with data consumers that users of the persona management system have consented to (for example, by providing input to the persona management system 102 via a mobile app, web-based console, or other interface).

In an embodiment, a persona management system 102 interacts with a plurality of data providers 110A-110N. Each of the data providers 110A-110N generally represents an external entity that possesses data associated with one or more users of the persona management system 102. The data providers 110A-110N can include, for example, various credit scoring agencies, banks, government agencies, or any other type of entity in possession of user data, where the user data may be stored at one or more respective data source(s) 114A-114N (for example, databases, files, etc.) managed by the respective data providers. As described in more detail hereinafter, in some embodiments, the data providers 110A-110N interact with the persona management system 102 via remote agents 114A-114N running at the data providers.

In an embodiment, data consumers 116 generally represent any entity that periodically seeks to obtain insights about populations of users. In some examples, one or more of the data consumers 116 might desire information about types of users to provide various types of data to relevant users such as, for example, customized offerings of goods or services or to send other types of electronic communications to selected types of users.

In an embodiment, a user 114 is any individual for whom data may be possessed by one or more of the data providers 110A-110N. A user 114 may have an account established with the persona management system 102, for example, based on the user's registration with the system via a mobile app or web-based console, and have user credentials that the user uses to authenticate with the persona management system 102. As indicated above, a user account 106 can be further associated with various other profile information, consent information, public and private keys, among other possible data.

1.1. Links Gathering Phase

In an embodiment, a persona management system 102 performs a links gathering phase to obtain user metadata 118 about users of the persona management system. In general, the persona management system 102 uses remote agents 112A to obtain data from data providers 110A-110N related to users of the persona management system 102 by causing the execution of "personal information matching" algorithms at the data providers 110A-110N. For example, the personal information matching algorithms may be created/authored by the operator of the persona management system 102 to obtain transformed items of information about users of the persona management system from the data providers 110A-110N without collecting the underlying data itself. The persona management system 102 may use any number of personal information matching algorithms at each data provider 110A-110N depending on the desired types of information about the users. For example, some or all of the personal information matching algorithms may be created in collaboration with data consumers and/or data providers in order to obtain information that can be used to satisfy queries expected to be created by data consumers 116. For example, if it is known that a data consumer 116 is likely to send queries used to locate users of the persona management system 102 that are males associated with a credit score above a specified threshold, the persona management system 102 can create one or more personal information matching algorithms that generate user metadata 108 that can readily satisfy that query (for example, by returning a true or false value for each user indicating whether the user is male and has a credit score exceeding the specified threshold) without storing the underlying data that is used to generate the user metadata 108.

As indicated above, some or all of the user metadata 108 is a transformed version of the data stored by the data providers 110A-110N. In some cases, the user metadata 108 includes dimensionally reduced data items about users of the persona management system 102, such as Boolean values, ranges of numerical values, values from an enumerated set of values, and the like. For example, if a data provider stores data indicating a user's birth date, a dimensionally reduced version of this data might indicate only that the user's age is in the range 30-40, or a true or false value indicating whether the user is an adult, thereby providing useful information about the user without having to store the user's actual age at the persona management system 102. Although the transformation of a user's age is provided as an example, actual items of transformed data may be based on more complex transformations of underlying user data or combinations of various disparate items of user data.

In various embodiments, the user metadata 108 collected for users of the persona management system 102 can be stored as separate data sets for each user (for example, in association with other data stored in association with users accounts 106), or the data for many users may be stored as part of a same metadata data set. As indicated above, the generated user metadata 108 for users of the persona management system 102 generally enables faster and more efficient referencing of users based on the data stored about the users at any number of separate data providers 110A-110N, among other benefits.

In an embodiment, the personal information matching algorithms, user metadata 108, and other information related to users of the persona management system 102 are stored securely at the persona management system 102. In some embodiments, the user metadata 108 is not shared with any other entity directly, except that users of the persona management system 102 may be allowed to view information that has been collected for that user (for example, by logging in and requesting the information via a mobile app or web-based console).

FIG. 1 illustrates a process for performing a links gathering phase according to some embodiments. At circle "1," the persona management system 102 creates personal information matching algorithms related to data about users of the system, and sends the algorithms to the various data providers 110A-110N, where the algorithms can be executed by the remote agents 112A-112N at the data providers. In various embodiments, the algorithms can include database queries, scripts, executable software applications, or any other mechanism for obtaining the relevant data from the data providers, or any combination thereof.

In an embodiment, at circle "2," the remote agents 112A-112N at the data providers 110A-110N execute the personal information matching algorithms obtained from the persona management system 102 and return transformed data to the persona management system 102. The remote agents 112A-112N can be configured to execute the personal information matching algorithms on a periodic basis (for example, once a day, once a week, or so forth) or in response to various triggers (for example, in response to detecting that a user's data has been modified at the data provider, in response to a request for the data from the persona management system 102, and so forth). As indicated above, the transformed data generated by the remote agents 112A-11N can include any type of transformed data or other data obtained about users of the persona management system 102 based on the data possessed by the respective data provider(s) 110A-110N.

In an embodiment, at circle "3," based on the transformed data obtained from the remote agents 112A-112N, the persona management system 102 creates and stores user metadata 108 including the transformed data about the users of the system. In some embodiments, the user metadata 108 can be associated with the various user accounts 106 of the system, as described above.

1.2. Links Search Phase

In an embodiment, data consumers 116 may periodically seek information identifying users of the persona management system 102 matching certain criteria. A data consumer 116 might desire to identify users matching certain criteria, for example, to provide information to the users such as offers for goods or services or any other data that might be relevant to the users. This process can be managed by the persona management system 116 and, in some embodiments, a data consumer 116 does not have direct interaction with the users of the persona management system 102 or with data possessed by the users by one or more data providers 110A-110N.

In an embodiment, the persona management system 102 generates anonymous identifiers of users of the persona management system that match a data consumer's 116 search request and provides only the anonymous identifiers to the requesting data consumer 116. These anonymous identifiers can be used such that an actual identity of the corresponding users is unknown to the data consumers 116 to protect the users' privacy and the security of the users' data. In some embodiments, an anonymous identifier generated for a user of the persona management system 102 is unique to each requesting data consumer 116. In other words, a different anonymous identifier may be generated for each data consumer 116 for the same user 114. Among other benefits, the creation of separate anonymous identifiers prevents data consumers 116 from correlating the anonymous identifiers in attempts to determine the actual identity of users of the persona management system 102 or otherwise compromise users' security. Furthermore, this anonymous identifier-data consumer pair allows data consumers 116 to reuse the anonymous identifiers to request delivery of additional data to users of the persona management system 102 at a later time, if desired. It is also noted that multiple anonymous identifiers can be created for a user relative a particular data consumer (for example, across different session with the data consumer), and that anonymous identifiers can be revoked in response to various conditions.

Figure 2:
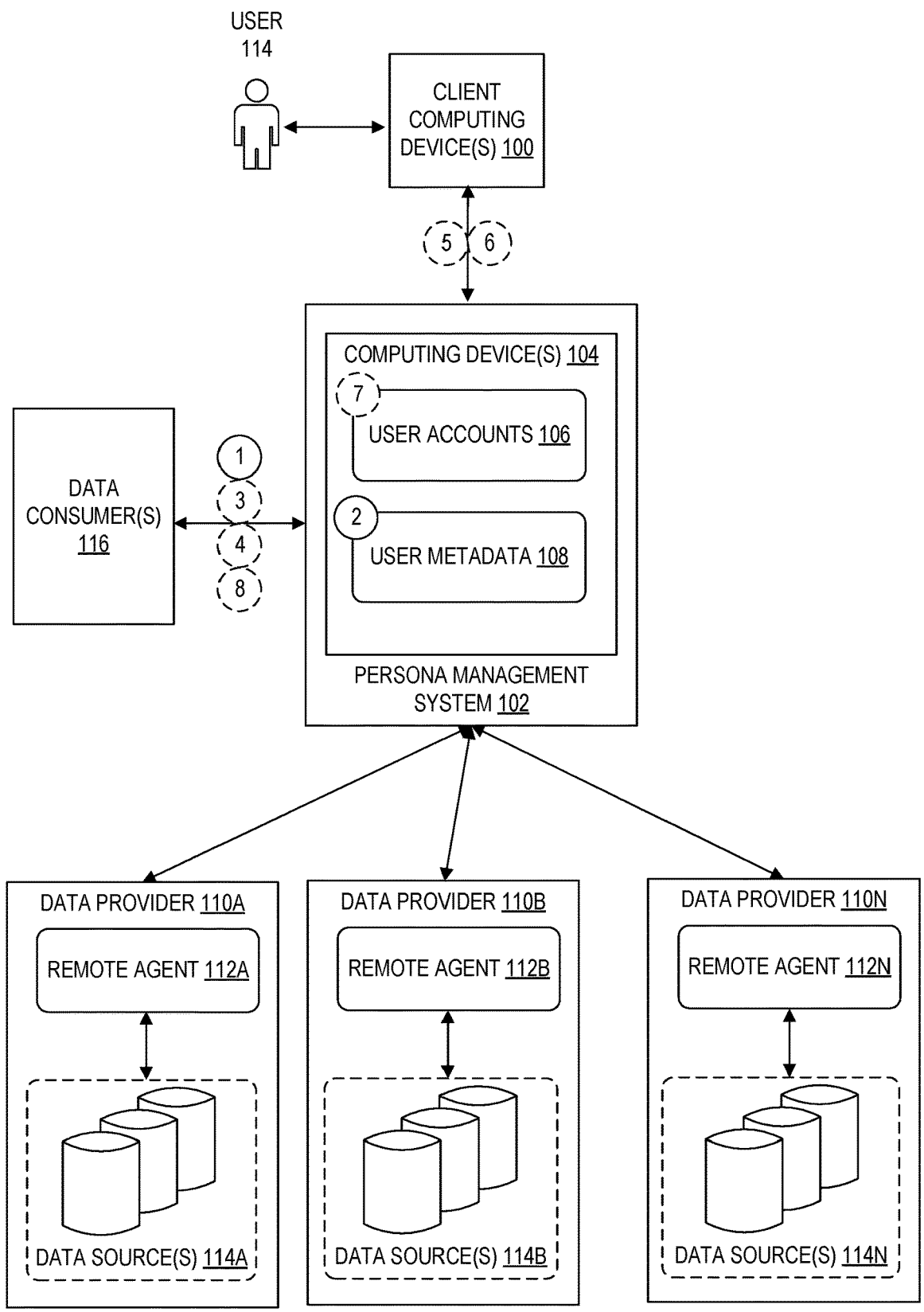
FIG. 2 is a diagram illustrating a computing environment for enabling data consumers to identify users that match one or more criteria of interest without divulging the actual identity of the users and without divulging the user's data according to some embodiments.

FIG. 2 is a diagram illustrating a computing environment for using user metadata generated by the persona management system to satisfy requests from data consumers according to some embodiments. In an embodiment, at circle "1" in FIG. 2, a data consumer 116 generates and sends one or more search requests for users that match specified search criteria. The search requests may be generated and sent, for example, using one or more interfaces of the persona management system 102 such as an application programming interface (API), web-based console, or any other type of interface.

In an embodiment, some or all the criteria specified by a data consumer 116 in a search request relates to the transformed data about users included in the user metadata 108, where the transformed data was created at least in part by the remote agents 112A-112N as described above. In some examples, the transformed data can include dimensionally reduced data that indicates various user attributes such as, for example, whether the user is an adult, whether a score associated with a user is above a certain threshold, an income range associated with the user, and the like. As indicated above, this transformed data can provide information about users of the persona management system 102 without revealing the actual identity of the users and without divulging the underlying data from which the transformed data was derived.

At circle "2," the persona management system 102 system searches user metadata 108 of users that have a user account with the persona management system. In some embodiments, the persona management system 102 searches only the data for users that have provided input associated with their user account 106 indicating their consent to having their user metadata 108 searched. The provided consent for uses of a users' metadata 108 to can be relative to all data consumers 116 or specific to only particular data consumers or types of search requests.

At circle "3," the persona management system 102 determines a number of users that satisfy the search criteria specified by the requesting data consumer and, optionally, sends data indicating the number of users to the requesting data consumer 116. In an embodiment, the data indicating the users satisfying the search criteria includes anonymous identifiers of the users, where the anonymous identifiers may be specific to the requesting data consumer 116 and session with the data consumer, as described above. In one embodiment, the persona management system 102 sends multiple sets of anonymous identifiers to the data consumer 116, where each set contains identifiers of users that match a subset of the criteria specified in the data consumer's request.

At circle "4," the requesting data consumer 116 optionally requests the persona management system 102 to send a message to some or all of the users identified in response to the data consumer's request. In some examples, the message sent to the users includes data indicating an offer for goods to services that is believed to be relevant to the users. In an embodiment, the data consumer 116 generates the request using the anonymous identifiers provided by the persona management system 102 at circle "3" above. In some examples, a data consumer 116 may decide not to send data to the identified users, for example, because the number of matching users is below a desired threshold number of users.

At circle "5," the persona management system 102 optionally requests consent from the identified users for the data consumer 116 to send the data (for example, data indicating one or more offers of goods or services) to the users (assuming that the consent has not already been provided by the users). In one embodiment, a request for consent sent to the users may include one or more of: (i) an indication of the search criteria specified by the data consumer 116 that resulted in the user being identified; (ii) a message explaining the search criteria; (iii) an explanation of the data that the data consumer 116 has requested to send to the user (for example, an explanation of an offer for goods or services, including terms and conditions of the offer); (iv) a duration of validity of any consent provided by the user; (v) and an indication of whether the user consents to receive additional offers from the data consumer 116 during the consent validity period. In some embodiments, the request sent to the user(s) can be sent as a notification that is displayed in a web-based console or mobile app, via an email, or in any other format.

In an embodiment, at circle "6," a user optionally provides input to the persona management system 102 indicating the user's consent to receive the data from the requesting data consumer(s) 116. If the user provides the requested consent, the persona management system 102 optionally returns a consent receipt to the user (that is, data indicating the consent that was given along with other information such as a time the consent was given, a duration for the consent, and so forth, where the consent receipt may be digitally signed). In other examples, a user may have provided consent in advance for one or more types of communications with data consumers 116—for example, categories of communications such as communications representing offers of auto loans, credit card offers, technical support, and the like. In this example, the persona management system 102 can provide information to a requesting data consumer 116 indicating both how many users matched its criteria and how many users matching the criteria have previously consented to receiving such offers.

In an embodiment, at circle "7," the indication of consent obtained from user(s) 114 is stored as part of a consent management component associated with the users accounts 116 at the persona management system 102.

In an embodiment, at circle "8," the persona management system 102 generates an anonymous identifier for each user that has provided consent to receive data from the data consumer 116 (if not generated previously) and returns the anonymous identifiers to the data consumer 116. In some embodiments, the persona management system 102 further generates a unique search identifier and returns it to the data consumer 116. In this example, a data consumer 116 can optionally use the search identifier to make additional requests related to the same set of users (with the understanding that the request can be made to possibly only a subset of matching users that previously consented to receiving additional communications, as described above).

1.3. Mediated Communications Phase

In an embodiment, a data consumer 116 sends data to some or all of the users that match criteria specified by a search request and have consented to such communications, as described above. For example, the data can include an offer for services directed at the users that have been identified based on the search request or any other type of communication, as described above. In an embodiment, the persona management system 102 can further mediate interactions between data consumers 116 and users 114 of the persona management system. In general, users 114 involved in these types of interactions may have previously provided their consent to receive data from particular data consumers 116.

In some embodiments, certain types of interactions between a data consumer 116 and a user of the persona management system 102 may necessitate divulging a user's actual identity to a data consumer (e.g., certain types of monetary transactions that have tax implications). In these examples, the persona management system 102 provides an indication to relevant users 114 about this potential loss of anonymity as part of forwarding the data from the data consumers 116 to the users 114. For example, the users 114 may be presented with a notification or other message accessible via a mobile app or web-based console as part of determining whether the user desires to receive or proceed with the offer.

Figure 3:
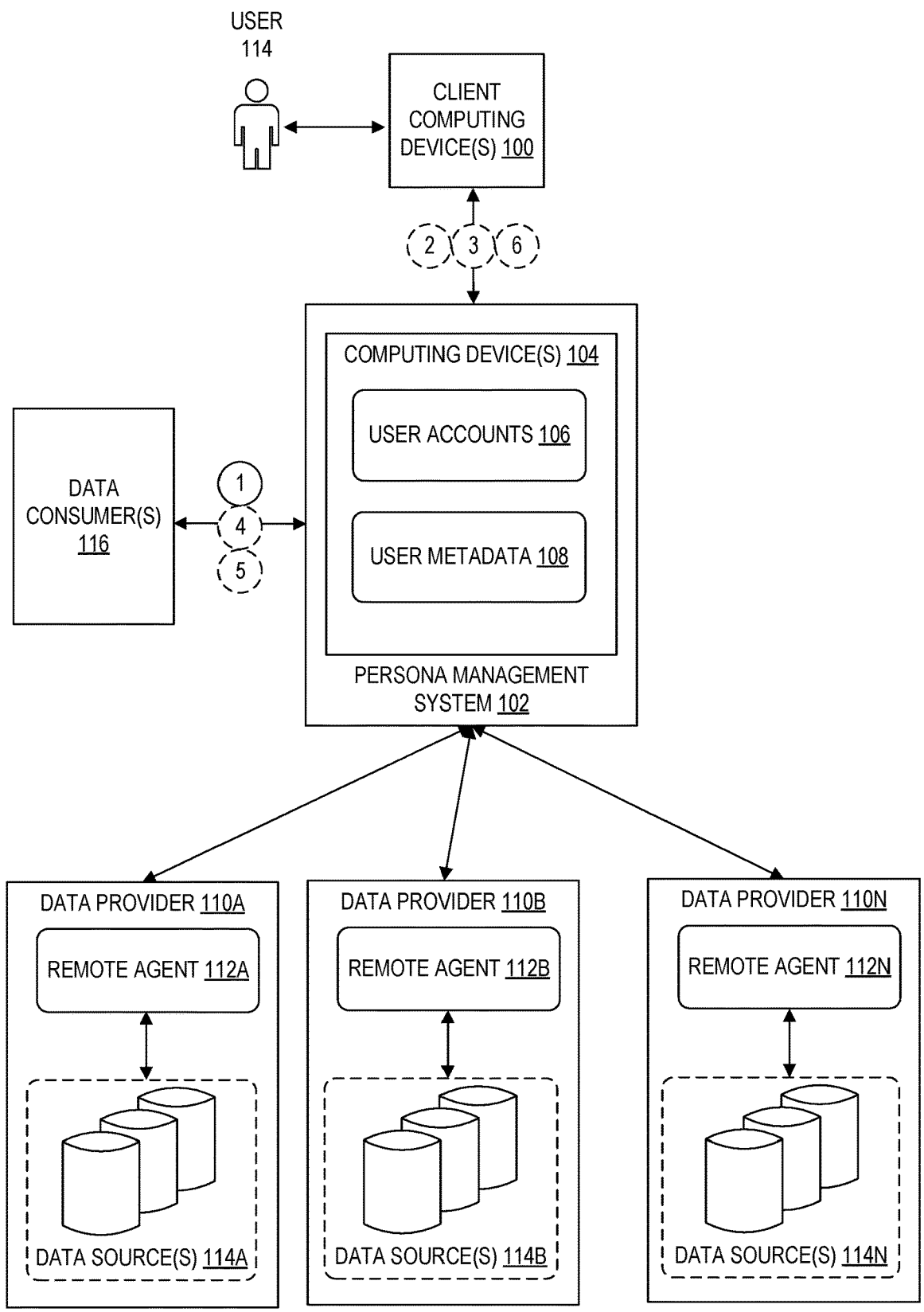
FIG. 3 is a diagram illustrating a computing environment for providing access to anonymized user data from data providers according to some embodiments.

FIG. 3 is a diagram illustrating an environment for a persona management system 102 to mediate certain types of interactions between a data consumer and users of the persona management system according to some embodiments. In an embodiment, at circle "1," a data consumer 116 sends a request to the persona management system 102 indicating data (for example, data indicating a particular type of offer to be evaluated) desired for delivery to particular users that satisfy one or more criteria specified by the data consumer (for example, as described above in reference to FIG. 2). In this example, the data consumer 116 may identify the users of interest based on the anonymous identifiers provided for the users by the persona management system 102 in response to a search request from the data consumer 116.

At circle "2," the persona management system 102 receives the request from the data consumer 116 indicating the data communications desired for delivery to the identified users and performs various operations in response to the request. In an embodiment, the persona management system 102 de-references the anonymous identifiers (for example, using a process to identify an internal identifier for users based on the previously generated anonymous identifiers), analyses the data from the data consumer 116 to be sent to the identified users, and then sends the data to the corresponding users (for example, in the form of data to be displayed to the users via a mobile app or web-based console). In some embodiments, the persona management system 102 includes an additional indication or flag indicating a possible loss of anonymity to the users if the persona management system 102 determines that a user's response to the data consumer 116 may involve the user revealing their true identity to the requesting data consumer 116.

At circle "3," users 114 provide input indicating their acceptance of an offer or other type of response to the data generated by a data consumer 116 and sent to the user, where the input indicating their response is stored in association with the user's account 106 at the persona management system 102. For example, a user can use a web-based console or mobile app to provide the input in association with a user account, as described above.

At circle "4," the persona management system 102 obtains the input indicating the user's response (for example, as included in the response sent back from the user or based on data stored in association with the user's account 106 at the persona management system 102) and sends, on behalf of the user, data indicating the user's decision to the requesting data consumer 116.

At circle "5," the data consumer 116 receives the indication of the user's decision and, assuming that a user has consented to receiving the data from the data consumer 116, sends the data to the persona management system 102 to be forwarded to the user 114. At circle "6," the persona management system 102 sends the data to the user (for example, the data may include data indicating an offer generated by the data consumer 116). As illustrated by this example, the persona management system 102 acts as a passive proxy for the user 114 and can further record information reflecting any back-and-forth interaction(s) between the user 114 and the data consumer 116, for example, as log data associated with the user's account 106.

Figure 4:
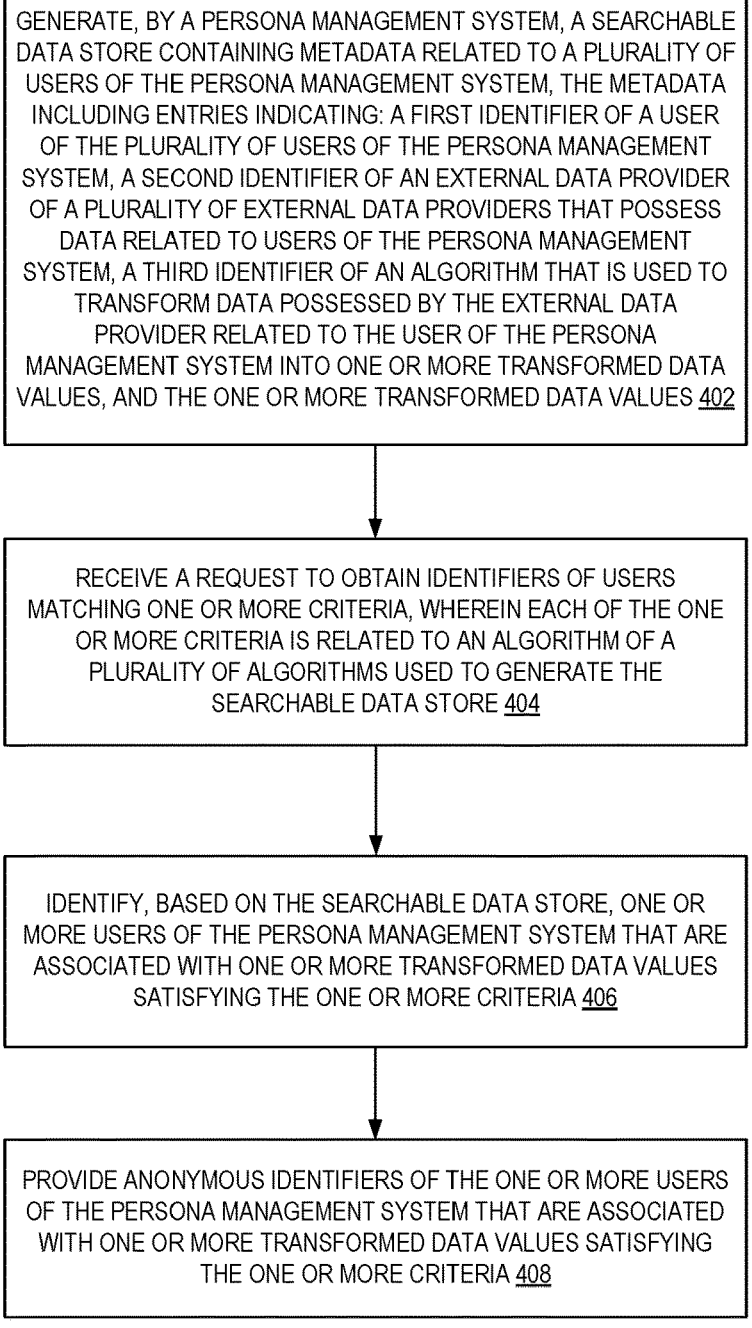
FIG. 4 is a flow diagram illustrating operations of a method for providing access to anonymized user data derived from external data providers, according to some embodiments.

FIG. 4 is a flow diagram illustrating operations 400 of a method for creating searchable metadata for users of a persona management system according to embodiments. Some or all of the operations 400 (or other processes described herein, or variations, and/or combinations thereof) are performed under the control of one or more computer systems configured with executable instructions and are implemented as code (for example, executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory.

The operations 400 include, at block 402, generating, by a persona management system, a searchable data store containing metadata related to a plurality of users of the persona management system, the metadata including entries indicating: a first identifier of a user of the plurality of users of the persona management system, a second identifier of an external data provider of a plurality of external data providers that possess data related to users of the persona management system, a third identifier of an algorithm that is used to transform data possessed by the external data provider related to the user of the persona management system into one or more transformed data values, and the one or more transformed data values.

In an embodiment, the metadata is generated at least in part by a plurality of remote agents, and wherein each remote agent of the plurality of remote agents is running at a computer system managed by a respective external data provider of the plurality of external data providers, and wherein each remote agent executes one or more algorithms against data possessed by the respective external data provider to obtain the transformed data values stored in the searchable data store. In an embodiment, each remote agent of the plurality of remote agents executes the one or more algorithms against the data possessed by the respective external data provider on a periodic basis.

In an embodiment, the one or more transformed data values include one or more dimensionally reduced values, wherein the one or more dimensionally reduced values obfuscate the data possessed by the data provider about the user of the persona management system. In an embodiment, the dimensionally reduced value is one or more of: a Boolean value, a range of values, or a value from an enumerated set of values.

The operations 400 further include, at block 404, receiving a request to obtain identifiers of users matching one or more criteria, wherein each of the one or more criteria is related to an algorithm of a plurality of algorithms used to generate the searchable data store.

The operations 400 further include, at block 406, identifying, based on the searchable data store, one or more users of the persona management system that are associated with one or more transformed data values satisfying the one or more criteria.

The operations 400 further include, at block 408, providing anonymous identifiers of the one or more users of the persona management system that are associated with one or more transformed data values satisfying the one or more criteria. In an embodiment, the anonymous identifiers are associated with a session with a data consumer sending the request to obtain the anonymous identifiers.

In an embodiment, the operations further include receiving, from the user of the persona management system, a request for data contained in the searchable data store related to the user, and providing to the user the data contained in the searchable data store related to the user. The data related to the user can include, for example, a record of queries/search requests that were executed on behalf of data consumers that resulted in a match for the user (and possibly the generation of an anonymous identifier), and may also include log data reflecting various interactions relative to the user and/or the user's data such as, for example, interactions between the user and the persona management system 102 (account changes, log-ins, consent management configurations, etc.) and between data consumers and the user (e.g., requests sent from a data consumer to a user based on the user being identified in a search, responses back from the user in response to data consumer requests, etc.)

Implementation Mechanism—Hardware Overview

According to one embodiment, the techniques described herein are implemented by one or more special-purpose computing devices. The special-purpose computing devices may be desktop computer systems, portable computer systems, handheld devices, networking devices or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques.

Figure 5:
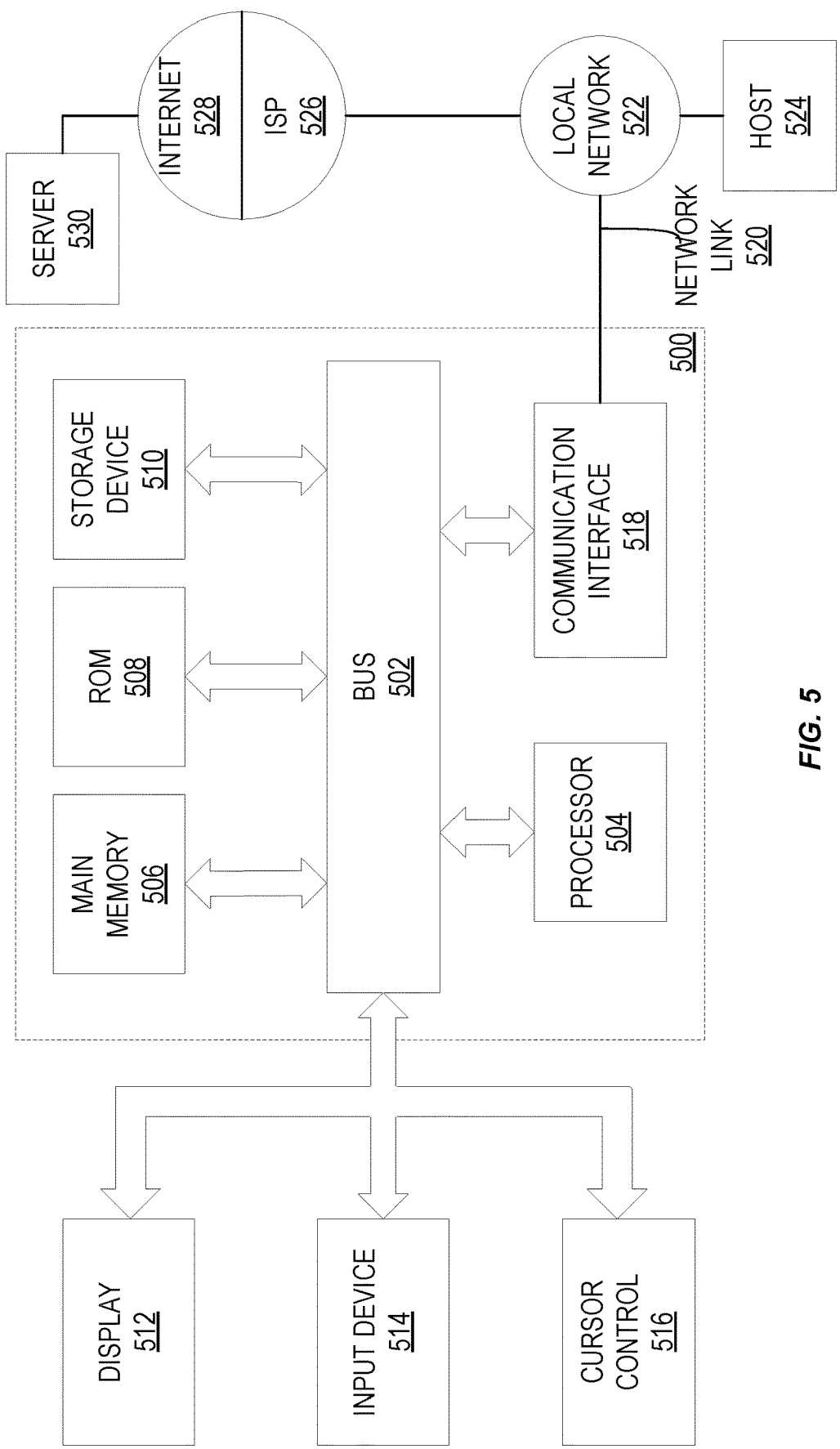
FIG. 5 illustrates a computer system upon which embodiments may be implemented.

FIG. 5 is a block diagram that illustrates a computer system 500 utilized in implementing the above-described techniques, according to an embodiment. Computer system 500 may be, for example, a desktop computing device, laptop computing device, tablet, smartphone, server appliance, computing mainframe, multimedia device, handheld device, networking apparatus, or any other suitable device.

Computer system 500 includes one or more buses 502 or other communication mechanism for communicating information, and one or more hardware processors 504 coupled with buses 502 for processing information. Hardware processors 504 may be, for example, general purpose microprocessors. Buses 502 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 500 also includes a main memory 506, such as a random access memory (RAM) or other dynamic or volatile storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 a special-purpose machine that is customized to perform the operations specified in the instructions.

Computer system 500 further includes one or more read only memories (ROM) 508 or other static storage devices coupled to bus 502 for storing static information and instructions for processor 504. One or more storage devices 510, such as a solid-state drive (SSD), magnetic disk, optical disk, or other suitable non-volatile storage device, is provided and coupled to bus 502 for storing information and instructions.

Computer system 500 may be coupled via bus 502 to one or more displays 512 for presenting information to a computer user. For instance, computer system 500 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 512 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 512.

One or more input devices 514 are coupled to bus 502 for communicating information and command selections to processor 504. One example of an input device 514 is a keyboard, including alphanumeric and other keys. Another type of user input device 514 is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. Yet other examples of suitable input devices 514 include a touch-screen panel affixed to a display 512, cameras, microphones, accelerometers, motion detectors, and/or other sensors. In an embodiment, a network-based input device 514 may be utilized. In such an embodiment, user input and/or other information or commands may be relayed via routers and/or switches on a Local Area Network (LAN) or other suitable shared network, or via a peer-to-peer network, from the input device 514 to a network link 520 on the computer system 500.

A computer system 500 may implement techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or a solid state drive of a remote computer. The remote computer can load the instructions into its dynamic memory and use a modem to send the instructions over a network, such as a cable network or cellular network, as modulate signals. A modem local to computer system 500 can receive the data on the network and demodulate the signal to decode the transmitted instructions. Appropriate circuitry can then place the data on bus 502. Bus 502 carries the data to main memory 506, from which processor 504 retrieves and executes the instructions. The instructions received by main memory 506 may optionally be stored on storage device 510 either before or after execution by processor 504.

A computer system 500 may also include, in an embodiment, one or more communication interfaces 518 coupled to bus 502. A communication interface 518 provides a data communication coupling, typically two-way, to a network link 520 that is connected to a local network 522. For example, a communication interface 518 may be an integrated services digital network (ISDN) card, cable modem, satellite modem, or a modem to provide a data communication connection to a corresponding type of telephone line. As another example, the one or more communication interfaces 518 may include a local area network (LAN) card to provide a data communication connection to a compatible LAN. As yet another example, the one or more communication interfaces 518 may include a wireless network interface controller, such as a 802.11-based controller, Bluetooth controller, Long Term Evolution (LTE) modem, and/or other types of wireless interfaces. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by a Service Provider 526. Service Provider 526, which may for example be an Internet Service Provider (ISP), in turn provides data communication services through a wide area network, such as the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

In an embodiment, computer system 500 can send messages and receive data, including program code and/or other types of instructions, through the network(s), network link 520, and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution. As another example, information received via a network link 520 may be interpreted and/or processed by a software component of the computer system 500, such as a web browser, application, or server, which in turn issues instructions based thereon to a processor 504, possibly via an operating system and/or other intermediate layers of software components.

In an embodiment, some or all of the systems described herein may be or comprise server computer systems, including one or more computer systems 500 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
    generating, by a persona management system, a searchable data store containing metadata related to a plurality of users of the persona management system, the metadata including entries indicating:
        a first identifier of a user of the plurality of users of the persona management system,
        a second identifier of an external data provider of a plurality of external data providers that possess data related to users of the persona management system,
        a third identifier of an algorithm that is used to transform data possessed by the external data provider related to the user of the persona management system into one or more transformed data values, and
        the one or more transformed data values;
    receiving a request to obtain identifiers of users matching one or more criteria, wherein each of the one or more criteria is related to an algorithm of a plurality of algorithms used to generate the searchable data store;
    identifying, based on the searchable data store, one or more users of the persona management system that are associated with one or more transformed data values satisfying the one or more criteria; and
    providing anonymous identifiers of the one or more users of the persona management system that are associated with one or more transformed data values satisfying the one or more criteria.

2. The computer-implemented method of claim 1, wherein the metadata is generated at least in part by a plurality of remote agents, and wherein each remote agent of the plurality of remote agents is running at a computer system managed by a respective external data provider of the plurality of external data providers, and wherein each remote agent executes one or more algorithms against data possessed by the respective external data provider to obtain the transformed data values stored in the searchable data store.

3. The computer-implemented method of claim 2, wherein each remote agent of the plurality of remote agents executes the one or more algorithms against the data possessed by the respective external data provider on a periodic basis.

4. The computer-implemented method of claim 1, wherein the anonymous identifiers are associated with a session with a data consumer sending the request to obtain the anonymous identifiers.

5. The computer-implemented method of claim 1, wherein the one or more transformed data values include one or more dimensionally reduced values, wherein the one or more dimensionally reduced values obfuscate the data possessed by the data provider about the user of the persona management system.

6. The computer-implemented method of claim 5, wherein the dimensionally reduced value is one or more of: a Boolean value, a range of values, a value from an enumerated set of values.

7. The computer-implemented method of claim 1, further comprising:
    receiving, from the user of the persona management system, a request for data contained in the searchable data store related to the user; and
    providing to the user the data contained in the searchable data store related to the user.

8. The computer-implemented method of claim 1, further comprising:
    receiving a request to send data to one or more users of the persona management system, the request identifying the one or more users using the anonymous identifiers;
    determining the one or more users associated with the anonymous identifiers; and
    sending the data to the one or more users.

9. A system comprising:
    a remote agent implemented by a first one or more electronic devices, the remote agent including first instructions that upon execution cause the remote agent to:
        generate metadata to be stored in a searchable data store of a persona management system, the metadata related to a plurality of users of the persona management system, the metadata including entries indicating:
            a first identifier of a user of the plurality of users of the persona management system,
            a second identifier of an external data provider of a plurality of external data providers that possess data related to users of the persona management system,
            a third identifier of an algorithm that is used to transform data possessed by the external data provider related to the user of the persona management system into one or more transformed data values, and
            the one or more transformed data values;
    the persona management system implemented by a second one or more electronic devices, the persona management system including second instructions that upon execution cause the persona management system to:
        receive a request to obtain identifiers of users matching one or more criteria, wherein each of the one or more criteria is related to an algorithm of a plurality of algorithms used to generate the searchable data store;
        identify, based on the searchable data store, one or more users of the persona management system that are associated with one or more transformed data values satisfying the one or more criteria; and
        provide anonymous identifiers of the one or more users of the persona management system that are associated with one or more transformed data values satisfying the one or more criteria.

10. The system of claim 9, wherein the metadata is generated at least in part by a plurality of remote agents, and wherein each remote agent of the plurality of remote agents is running at a computer system managed by a respective external data provider of the plurality of external data providers, and wherein each remote agent executes one or more algorithms against data possessed by the respective external data provider to obtain the transformed data values stored in the searchable data store.

11. The system of claim 10, wherein each remote agent of the plurality of remote agents executes the one or more algorithms against the data possessed by the respective external data provider on a periodic basis.

12. The system of claim 9, wherein the anonymous identifiers are associated with a session with a data consumer sending the request to obtain the anonymous identifiers.

13. The system of claim 9, wherein the one or more transformed data values include one or more dimensionally reduced values, wherein the one or more dimensionally reduced values obfuscate the data possessed by the data provider about the user of the persona management system.

14. The system of claim 13, wherein the dimensionally reduced value is one or more of: a Boolean value, a range of values, or a value from an enumerated set of values.

15. The system of claim 9, wherein the second instructions upon execution further cause the persona management system to:
- receive a request to send data to one or more users of the persona management system, the request identifying the one or more users using the anonymous identifiers;
- determine the one or more users associated with the anonymous identifiers; and
- send the data to the one or more users.

16. A non-transitory computer-readable storage medium storing instructions which, when executed by one or more processors, cause performance of operations comprising:
- generating, by a persona management system, a searchable data store containing metadata related to a plurality of users of the persona management system, the metadata including entries indicating:
  - a first identifier of a user of the plurality of users of the persona management system,
  - a second identifier of an external data provider of a plurality of external data providers that possess data related to users of the persona management system,
  - a third identifier of an algorithm that is used to transform data possessed by the external data provider related to the user of the persona management system into one or more transformed data values, and
  - the one or more transformed data values;
- receiving a request to obtain identifiers of users matching one or more criteria, wherein each of the one or more criteria is related to an algorithm of a plurality of algorithms used to generate the searchable data store;
- identifying, based on the searchable data store, one or more users of the persona management system that are associated with one or more transformed data values satisfying the one or more criteria; and
- providing anonymous identifiers of the one or more users of the persona management system that are associated with one or more transformed data values satisfying the one or more criteria.

17. The non-transitory computer-readable storage medium of claim 16, wherein the metadata is generated at least in part by a plurality of remote agents, and wherein each remote agent of the plurality of remote agents is running at a computer system managed by a respective external data provider of the plurality of external data providers, and wherein each remote agent executes one or more algorithms against data possessed by the respective external data provider to obtain the transformed data values stored in the searchable data store.

18. The non-transitory computer-readable storage medium of claim 17, wherein the anonymous identifiers are associated with a session with a data consumer sending the request to obtain the anonymous identifiers.

19. The non-transitory computer-readable storage medium of claim 16, wherein the one or more transformed data values include one or more dimensionally reduced values, wherein the one or more dimensionally reduced values obfuscate the data possessed by the data provider about the user of the persona management system.

20. The non-transitory computer-readable storage medium of claim 19, wherein the dimensionally reduced value is one or more of: a Boolean value, a range of values, a value from an enumerated set of values.

* * * * *